July 19, 1938. J. T. RAUEN ET AL 2,124,081
ENGINE BRAKE
Original Filed Oct. 9, 1931   4 Sheets-Sheet 2
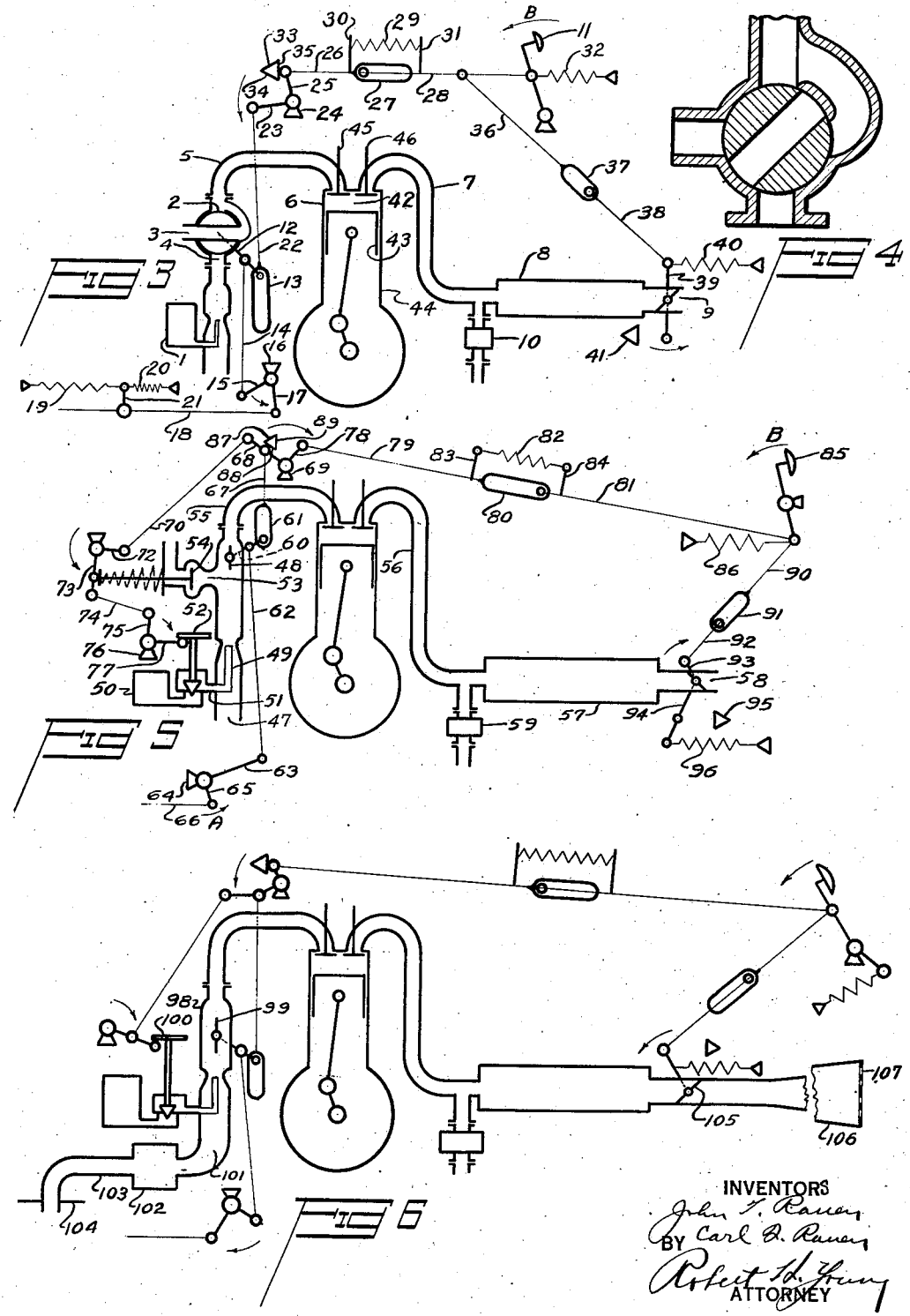

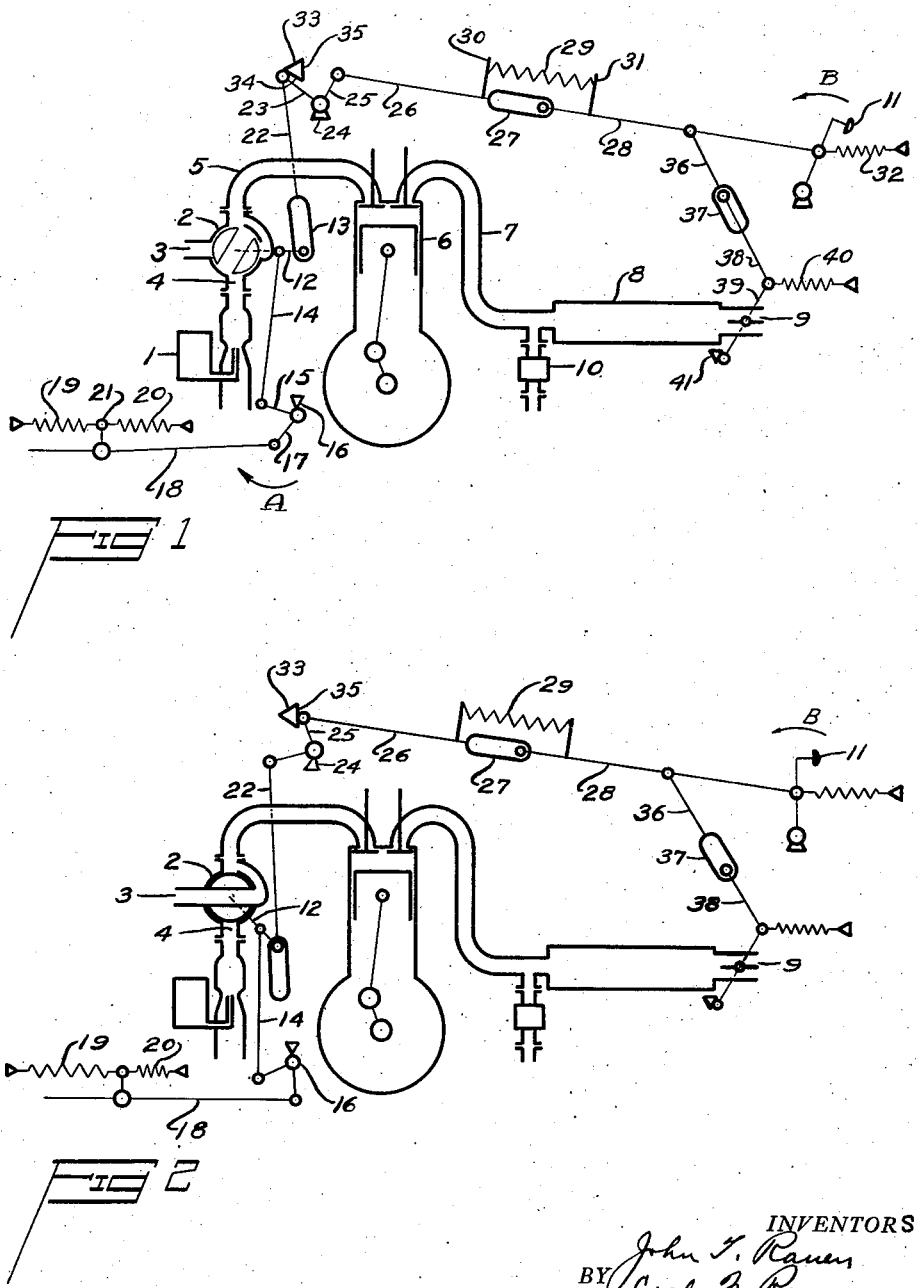

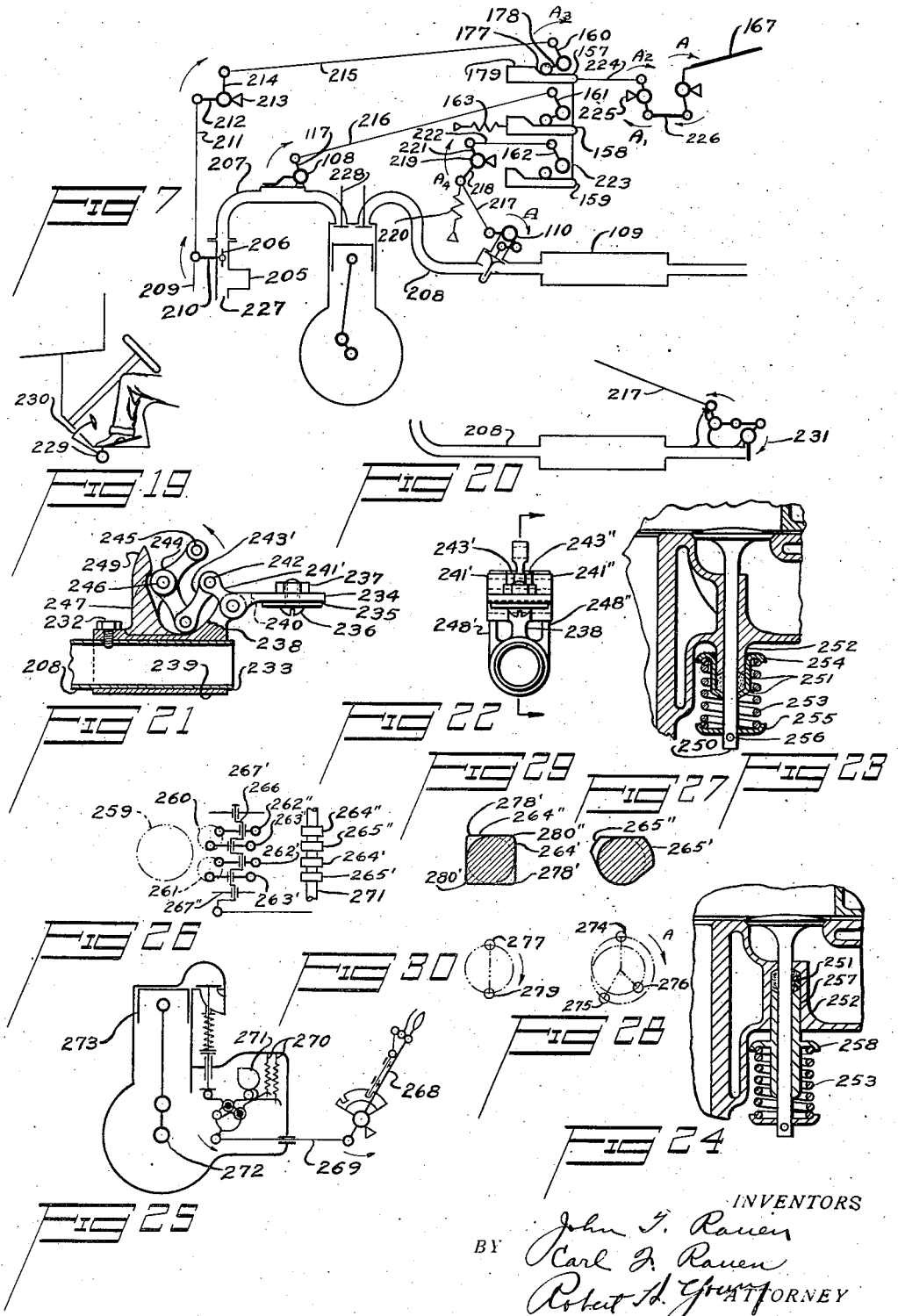

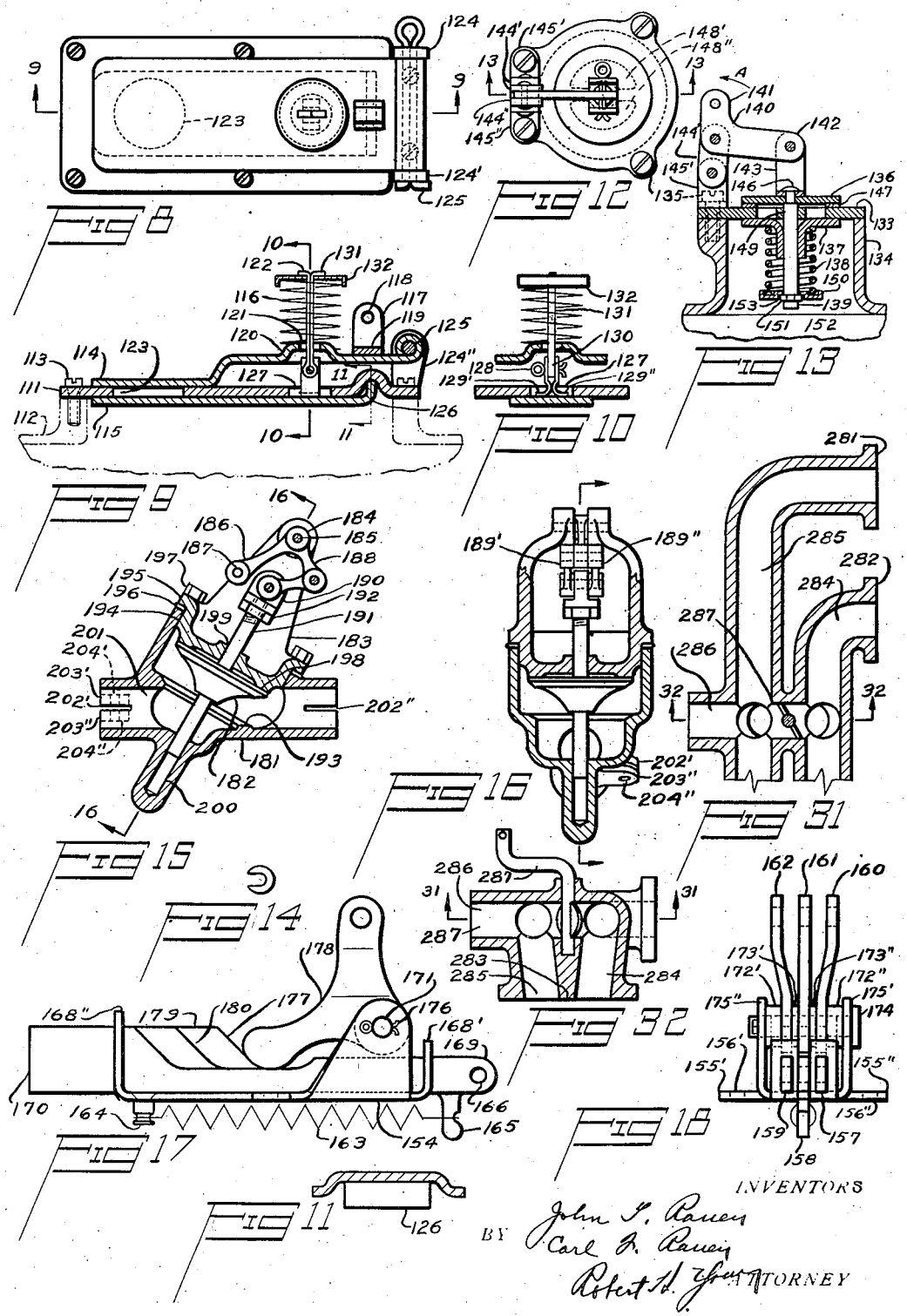

Patented July 19, 1938

2,124,081

UNITED STATES PATENT OFFICE 2,124,081

ENGINE BRAKE

John T. Rauen and Carl F. Rauen, Grosse Pointe, Mich.

Application October 9, 1931, Serial No. 567,964
Renewed August 4, 1936

37 Claims. (Cl. 123—97)

This invention relates to decelerating and final stopping of automobiles and the like by means of their engines.

To convert a conventional four-stroke cycle internal combustion engine from a "power producer" into a brake or "power absorber", to the limit of which it is capable, it is necessary; 1st to eliminate fuel from entering the engine and admit atmosphere only thereto, 2nd to prevent the exit of said atmosphere therefrom, and 3rd to provide an exhaust system having a volumetric capacity between the engine and a shut-off valve within said exhaust system, equal to or greater than twelve times the volumetric size of the cylinder, of a single cylinder or one cylinder of a multi-cylinder engine.

This invention, therefore, has for its object to provide in a device of this character; means for converting the engine into a fluid compression brake; to provide means for obtaining the maximum braking power possible therefrom; to provide means of supercharging while braking; to provide means of eliminating objectionable exhaust sound from within the hood or the engine compartment; to provide means whereby fumes resulting from the engine operating as a brake are prevented from annoying the occupants of the car; to provide means of positively preventing any explosions in either the exhaust or induction systems while said engine is braking; to provide unitary means of distributing controlling action for operating in proper sequence all valves, etc. effecting engine braking; to provide means for actuating completely said unitary means by a single to and fro motion of that foot which the operator normally uses to actuate the clutch of the vehicle's power transmission system; to provide means of converting the engine when acting as a brake from a four-stroke cycle to a two-stroke cycle; to provide means of automatically or manually by-passing the air into an auxiliary reservoir, while the engine is braking, said reservoir being used to supply air under pressure thus created for lowering time of raising pressure in exhaust system from zero to maximum and to operate auxiliary apparatus useful about said vehicle; to provide means for establishing communication between a plurality of manifolds in the induction systems of an engine while braking, thereby requiring but one air inlet control valve.

This invention will be best understood by reference to the following description of several embodiments thereof shown in the accompanying drawings, wherein:

Fig. 1 is a diagrammatic view of one embodiment of this invention showing the constituting mechanism thereof in its restored or inactive position;

Fig. 2 is an illustration of the mechanism of Fig. 1, in a preliminary stage of action;

Fig. 3 is an illustration of the mechanism of Fig. 1 in the final stage of action;

Fig. 4 is an enlarged cross-sectional view of the throttle valve within the induction system as shown in Figs. 1, 2 and 3;

Fig. 5 is a diagrammatic sectional view of a modification of this invention;

Fig. 6 is a diagrammatic view of another modification of this invention;

Fig. 7 is a diagrammatic view of a further modification of this invention;

Fig. 8 is a top plan view of a valve shown in Fig. 7;

Fig. 9 is a sectional view of Fig. 8 on line 9—9;

Fig. 10 is a cross-sectional view of Fig. 9 on line 10—10;

Fig. 11 is a cross-sectional view of Fig. 9 on line 11—11;

Fig. 12 is a top plan view of a modified form of valve as shown in Figs. 8, 9, 10 and 11;

Fig. 13 is a cross-sectional view of Fig. 12 on line 13—13;

Fig. 14 is a plan view of split washer;

Fig. 15 is an enlarged cross-sectional view of valve shown in Fig. 7;

Fig. 16 is a cross-sectional view taken on line 16—16 of Fig. 15;

Fig. 17 is a side view of the unitary means of distributing control to valves as shown in Fig. 7;

Fig. 18 is an end view of Fig. 17;

Fig. 19 is a diagrammatic illustration showing a preferred form of manual control of the brake mechanism;

Fig. 20 is a diagrammatic view of a modification of the exhaust system shown in Fig. 7;

Fig. 21 is an enlarged part cross-sectional view of the valve shown in Fig. 20;

Fig. 22 is an end view of Fig. 21;

Fig. 23 is a cross-sectional view of a detail of our invention;

Fig. 24 is a cross-sectional view of a detail of our invention;

Fig. 25 is a diagrammatic sectional view of a conventional internal combustion engine as provided to be converted from a four-stroke cycle to a two-stroke cycle of operation;

Fig. 26 is a diagrammatic top view of Fig. 25;

Fig. 27 is a diagrammatic view of the cams of a conventional four-stroke cycle engine;

Fig. 28 is a diagram showing four-cycle operation;

Fig. 29 is a diagrammatical view of the cam for two-stroke cycle operation;

Fig. 30 is a diagram showing two-cycle operation;

Fig. 31 is a one-quarter sectional view of a dual induction manifold along line 31—31 of Fig. 32; and Fig. 32 is a half sectional view of Fig. 31 along line 32—32 of Fig. 31.

In Figs. 1, 2 and 3 we have provided and shown diagrammatic illustrations of three different stages of the operating mechanism of one embodiment of our invention as applied to a four-stroke cycle type of conventional internal combustion engine. As illustrated a single cylinder engine is shown, having an induction system and an exhaust system. The induction system comprises a conventional single passage or plain tube carburetor 1, a two passage throttle valve 2 for regulating entry of atmosphere only at passage 3 and combustible gas only at passage 4, and a pipe connection 5 with the cylinder 6. The exhaust system consists of a pipe connection 7 for communicating the cylinder 6 and exhaust silencer 8, and in communicating with said silencer a valve 9 for shutting the exhaust system. Communicating with the pipe 7 is a one-way valve 10 adapted to communicate with a suitable auxiliary storage tank (not shown) permitting entry of air only thereto while the engine is braking. The operation of the valve 2 in the induction system and valve 9 in the exhaust system being controlled manually by means of pedal 11 in a manner hereinafter described.

Fig. 1 shows the braking mechanism as being fully restored or inactive. In this state the engine can be operated as a power and controlled as such by means of the throttle valve 2, which is of conventional barrel type construction, being provided to control two passages instead of one, and, as shown in the fully closed position, is midway between passage 4 for mixture and passage 3 for atmosphere only. In practice it is customary to retain the mixture passage 4 slightly open so that the gas can flow to the engine from the carburetor, keeping the engine operating at what is conventionally known as "idling", and this said opening of valve 2 for idling is provided for tensioning of the springs 19 and 20 so that at the tension where they balance each other's force, the valve 2 is positioned as mentioned, rather than as illustrated. The above mentioned slight opening of valve 2 is conventionally referred to as "closed throttle" position, therefore, for the purpose of simplifying matters to facilitate ready understanding of this invention, the drawings illustrate the actual closed position of the valve 2 and gas passage 4.

At this point it will aid in understanding how our invention in this respect differs novelly from other art to mention that conventionally, the slight opening of valve 2, facilitating engine idle is provided by an adjustable positive stop, preventing complete closing of the passage 4 by routine closing of valve 2, while we provide a yielding stop which during routine closing performs the same function as the conventional stop, yet will yield to provide complete closing under the influence of operating the braking means, while the conventional stop mentioned above, and therefore a part of the other art since such art merely mentions conventional valves, permit no similar action.

Conventional manual means operate the throttle valve 2 to control the engine for producing power and, as diagrammatically illustrated in part, consists of a crank arm 12, one end of which is attached to the throttle valve 2 for imparting rotating action thereto, the other end being slidably and pivotally connected to link 13 and intermediate of these ends, pivotally connected to a rod 14, having its opposite end pivotally connected to one arm 15 of bell-crank 16, the other arm 17 of which being pivotally connected to one end of rod 18, the opposite end of which being connected to the conventional, manually operated accelerator pedal (not shown).

Springs 19 and 20 are provided to return the throttle valve 2 from any open degree of passages 3 and 4 to fully closed thereof, retaining same in said closed position until further manually acted upon, by opposing each other's action and by being equal in strength to neutralize or balance their opposing forces. As shown, they are suitably anchored at one end and at the opposite end are jointed together onto one end of arm 21, the other end of which is fixed to and movable with rod 18. To supply gas to the engine and to the extent requiring full opening of the gas passage 4 through the throttle valve 2, pressure is applied to the said conventional accelerator pedal (not shown), causing motion in direction of the arrow A to be imparted to the rod 18, stretching the spring 20, allowing contraction of spring 19 to bring about a state of unbalanced force between them and simultaneously acting upon ball-crank 16, which imparts movement to crank arm 12 of throttle valve to fully open gas passage 4, and while so doing the outer end of the crank 12 is idly moving within link 13 of rod 22.

The throttle valve 2 is brought back to the fully closed position through action of spring 20, which contracts when pressure is released upon said conventional accelerator pedal, and thus allows a state of balance to again take place between spring 19 and spring 20 as previously described.

For manually controlling the engine as a brake suitable mechanical control means are provided and, as diagrammatically illustrated, consist of a rod 22 having at one end a link 13 connected as before described with the crank arm 12 of throttle valve 2, the other end being pivotally connected to one arm 23 of bell-crank 24, the other arm 25 of which being pivotally connected to one end of a rod 26 having at its opposite end a link 27 slidably connected to one end of a rod 28, said rod 28 being yieldingly held at the extremity of link 27 by spring 29 imposed between arms 30 and 31 of rods 26 and 28 respectively, the other end of the rod 28 being pivotally connected to the pedal 11, having connected to it at this same place one end of spring 32, the other end of which being suitably anchored.

Between the arms 23 and 25 of bell-crank 24 is a stop 33 having a face 34, which registers with arm 23 to limit the movement of rod 22 in its upward direction, while face 35 registers with arm 25 to limit movement of the rod 22 in the opposite direction.

Pivotally secured to rod 28 is one end of rod 36 having at its opposite end a link 37 slidably connected to one end of a rod 38, the other end of which being pivotally connected to one end of lever 39, which has secured to it at this place one end of spring 40 and the other end suitably anchored. Intermediate of its length the lever 39 is fixed into the valve 9 and its lower end disposed to register with stop 41 by action of spring 40.

To operate the engine as a brake, pressure is applied to pedal 11, which moves in the direction of arrow B of Fig. 2 to move throttle valve 2 from any degree of opening of passage 4, to fully closed position thereof and on past to full open of passage 3, through means of rod 28 acting upon spring 29 which is disposed to transmit action unyieldingly from rod 26 to rod 28 attached to bell-crank 24 imparting movement thereto and also to rod 22 which acting upon crank arm 12 moves the throttle valve 2 to fully open of passage 4, at which position arm 25 of bell-crank 24 has contacted with face 35 of stop 33. During the movement of the throttle valve, as above described, action is being imparted to rod 14, to bell-crank 16 and to rod 18, which stretches the spring 19 bringing about unbalanced force between said springs 19 and 20, which again balance their forces and restore the throttle valve to fully closed position upon releasing pressure on pedal 11.

While the control mechanism is in this position the engine ceases to produce power and upon being driven by the vehicle offers very little braking power, drawing in atmosphere only and exhausting same, the braking power being substantially the same as that obtained by shutting off the ignition without the use of this mechanism.

To further increase the braking power as obtained in Fig. 2, the pedal 11 is moved from position shown therein to that shown in Fig. 3, bringing about the closing of valve 9 in the exhaust system by moving the rod 28, which at its one end is allowed to idly slide in link 27 by the yielding action of the spring 29 for imparting further movement to rod 36 which, during the movement of pedal 11 from position shown in Fig. 1 to that as shown in Fig. 2 takes up the lost motion of the link 37, bringing its end in contact with the end of rod 38 so that as pedal 11 moves from position shown in Fig. 2 to that shown in Fig. 3, movement is transmitted to lever 39 for closing the valve 9, which brings the pedal 11 to a stop.

With all parts in the position shown in Fig 3, the engine upon being driven by the vehicle offers very effective braking action and the cycle of operation thereof will be best understood by first considering the cycle of operation when the engine is driving the vehicle during which four strokes are made by the piston for each cycle and correspond to two revolutions of the engine's crank-shaft, each stroke representing one half revolution thereof and in sequence consists of; first, the stroke of induction as the piston moves outward of the cylinder; second, the stroke of compression, as the piston moves inward, completing one revolution; third, the stroke of power as the piston again moves outward of the cylinder; and fourth, the stroke of exhaust as piston again moves inward completing two revolutions and one cycle. These cycles continue during braking with the exception that the third stroke of the cycle discontinues as the power stroke, because of air instead of gas entering the cylinder (the spark being allowed to occur at all times) and the fourth or the exhaust stroke is used for power by having it act against a pressure greater than that which it acts against while the engine is driving the vehicle.

It will be further understood that in a conventional four-stroke cycle engine, a compression chamber is provided within the cylinder thereof, and as diagrammatically illustrated and designated by 42, consists of a space formed in part by the piston 43 at its innermost position within the cylinder 44, the walls and the head thereof, wherein gas is confined and raised from atmospheric pressure to a definite pressure in excess thereof according to conventional engine practice and, whereas this said definite pressure is incidentally caused to be substantially equal to the mean effective pressure occurring from combustion of the gas thus confined and its subsequent expansion during the power stroke of the piston, and whereas by closing the valve 9 in the exhaust system, the valve 2 in the induction system having previously been opened, the engines upon being driven, act as a pump capable of supplying atmosphere only to and for creating thereby a pressure of same within the exhaust system, the amount of which cannot be exceeded therein because the said compression chamber limits the volume to which the atmosphere can be reduced within the cylinder and the pressure resulting therefrom, forming a natural preventive against destructive pressure within the exhaust system when using such for storage as is done in this invention, which said pressure being substantially equal to the aforementioned definite pressure created within said compression chamber, the atmosphere upon being released from the exhaust system into the cylinder, as the piston starts the fourth stroke of the cycle, imposes a force upon the piston, the mean effective pressure of which during this said fourth stroke being substantially equal to the beforementioned mean effective pressure of combustion or power stroke by providing a volumetric capacity substantially equal to or greater than twelve times the volume displaced by one stroke of the piston 43, which is readily obtainable in the exhaust system of any motor vehicle by placing the valve 9 therein in such relation to the engine as diagrammatically illustrated in any of Figs. 1, 2, 3, 5, 6 or 7, a braking power is derived from the engine substantially equal to or greater than the driving power of same, because mechanical friction of the engine which detracts from the driving power, adds to the braking power thus obtained, the cycles occurring as follows:

Referring again to Fig. 3, it will be seen that the induction system is fully open for admitting atmosphere only to the cylinder 44 through the passage 3 of throttle valve 2 and at the start of the induction stroke of the first cycle, the cylinder valve 45 having been opened by action of mechanism (not shown) providing for actuation of both valves within conventional engines, the piston 43 being at its innermost position of the cylinder 44 moves outward thereof to the full distance of the first stroke of the cycle, drawing atmosphere through the induction system, into the cylinder, whereupon the cylinder valve 45 closes, sealing the cylinder as the piston 43 starts to move inward thereof, on the second stroke, compressing to the before-mentioned definite pressure the atmospheric charge taken therein during the above-mentioned induction stroke, confining said charge to the previously described compression chamber 42; immediately thereupon said piston again moves outward on the third stroke allowing the said confined atmospheric charge to expand and thereby lower its pressure to nearly zero as the said piston nears the end of this stroke, whereupon the cylinder valve 46 starts to open the cylinder in order that it may be fully open when the piston 43 is at its outermost position, whereupon the said piston immediately moves inward of the cylinder on the fourth and last stroke of the cycle to force the atmosphere therein, past the open valve 46 and into the closed exhaust system and at the completion of this stroke, which occurs at the innermost position of the piston within the cylinder, the cylinder valve 46 closes, completing the cycle and retaining within the exhaust system the atmosphere thus stored, amounting substantially to that taken into the cylinder during the said induction stroke, thereby effecting a slight raise in pressure of the atmosphere within said exhaust system and also within the compression chamber of the cylinder, leaving therein an abnormal pressure of the atmosphere, which normalizes by escaping into the induction system upon opening of the cylinder valve 45; said atmosphere returning thereto along with an additional amount, offsetting the loss of volume of the preceding charge occurring from leaks past piston, valves and joints of the exhaust system, so that at the start of a second cycle which occurs immediately upon closing of the cylinder valve 46, the piston again moves outward of the cylinder, and the cycles continue as described above, and each fourth or exhaust stroke of the succeeding cycles, forces additional atmosphere into the said exhaust system until the pressure of the atmosphere stored therein has been raised to an amount substantially equal to the previously described pressure to which the said cylinder is capable of compressing the atmosphere, after which additional atmosphere cannot be stored as previously described and as a result of this, each succeeding time the cylinder valve 45 opens, the atmosphere confined within the said compression chamber of the said cylinder and substantially equal in amount as previously described is released into the induction where it is freely allowed to lower its pressure to zero or normal for atmosphere, the energy of which being necessarily dissipated in favor of braking because were this atmosphere not allowed to escape from the cylinder it would not only act upon the piston during its following outward stroke, detracting from the ultimate braking power otherwise obtainable, but would prevent the operating cycle above described, which is a routine essential to practical functioning of an engine as brake.

Fig. 5 is a diagrammatic illustration of another embodiment of our invention, wherein the engine operating cycle remains substantially the same for driving and braking as described in Figs. 1, 2 and 3 and as illustrated consists of a single cylinder engine, having an inductive system and an exhaust system, the induction system consisting of a conventional double passage or air valve, carburetor, one of said passages being known as the primary passage 47, wherein is located at one end, a throttle valve 48 and at the opposite end, a fuel discharge nozzle 49 in communication with a fuel chamber 50 through a fuel passage 51, wherein is provided a valve 52; the other of said double passage is known as the secondary passage 53, one end of which is in communication with the primary passage 47, the other end having an automatic air valve 54; and a pipe connection 55 with cylinder. The exhaust system consists of a pipe connection 56 for communicating the cylinder and exhaust silencer 57 and in communication with said silencer a valve 58. Communicating with the said pipe 56 is a one-way valve 59, the purpose and function of which being the same as described in Fig. 1.

The engine is controlled as a power or for driving by conventional manual means, and, as diagrammatically illustrated in part, consists of a crank arm 60, one end of which is attached to throttle valve 48 for imparting rotating action thereto, the other end of which is slidable and pivotally connected to a link 61 and intermediate of its ends is a rod pivotally connected to one arm of a bell-crank 64, the other arm 65 of which is pivotally connected to one end of a rod 66, the other end of which is connected to the conventional manually operated accelerator pedal (not shown), which, as is conventional practice, is maintained in a fully restored or inactive position by a spring (not shown). When pressure is manually applied to said accelerator pedal, motion in direction to arrow "A" is transmitted to rod 66, to bell-crank 64, to rod 62, to crank arm 60, causing throttle valve 48 to open, the braking mechanism being normally and necessarily fully restored or inactive; the link 61 of rod 67 is in a position relative to end of crank arm 60, opposite to that shown and whereas the crank arm 60 is free to move within said link the full distance required for throttle valve 48 to move from fully closed to fully open thereof without transmitting corresponding movement to rod 67.

For manually controlling the engine as a brake suitable mechanical control means are provided and, as diagrammatically illustrated, consist of the rod 67 having at one end the link 61 connected as before described with the crank arm 60 of throttle valve 48, the other end being pivotally connected intermediate of one arm 68 of bell-crank 69, said arm 68 also having pivotally connected to it one end of rod 70, the opposite end pivotally connected to one arm 71 of bell-crank 72, the other arm 73 intermediate of its ends bearing upon valve 54 and pivotally connected at its end to one end of rod 74, the opposite end pivotally connected to arm 75 of bell-crank 76, the other arm 77 bearing under the head of valve 52; the other arm 78 of bell-crank 69 is pivotally connected to one end of rod 79 having at its opposite end a link 80 slidably connected to one end of a rod 81, said end being yieldingly held at the end of link 80 opposite to that shown by spring 82 imposed between arms 83 and 84 of rods 79 and 81 respectively, the other end of rod 81 is pivotally connected to a pedal 85 having connected to it at this same place one end of spring 86, the other end of which is suitably anchored.

Between arms 68 and 78 of bell-crank 69 is a stop 87 having a face 88, which registers with arm 68 to limit the movement of rod 67 in its upward direction, while face 89 registers with arm 78 to limit movement of said rods in the opposite direction.

Pivotally secured to pedal 85 is one end of rod 90 having at its opposite end a link 91 slidably connected to one end of rod 92, the other end pivotally connected to one end of a crank arm 93, the other end being attached to the valve 58 and one end of crank arm 94 also attached to valve 58 intermediate of its ends registering with stop 95 and the opposite end connected to one end of a spring 96, the other end of which is suitably anchored for returning valve 58 to register with stop 95 at its full open position.

To operate the engine as a brake, pressure is normally applied to pedal 85, which moves in the direction of arrow "B" to move throttle valve 48 from any position it might be in, to full open position and simultaneously opening air valve 54 and closing valve 52 to positively shut off fuel supply by imparting movement to rod 81 acting upon spring 82, which is disposed to transmit action unyieldingly from rod 81 to rod 79 to bell-crank 69, to rod 67, to crank arm 60 of valve 48; simultaneously with this action bell-crank 69 is transmitting movement to rod 70, to bell-crank 72, to rod 74, to bell-crank 76.

With the control mechanism in this position, the engine ceases to produce power and upon being driven by the vehicle offers very little braking power, drawing in atmosphere only and exhausting same, the braking power being substantially the same as that obtained by shutting off the ignition without use of this mechanism.

Further increase in power being obtained substantially the same as described in Fig. 3.

Fig. 6 is a diagrammatic illustration of another embodiment of our invention, wherein the engine operating cycle and the control mechanism are substantially of the same construction and operation for driving and braking as described in Figs. 1, 2, 3 and 5, differing only as regards the carburetor 98, which is a conventional single passage or plain tube type, the same as illustrated in Figs. 1, 2 and 3 excepting that the throttle valve 99 is of a butterfly type and located in the carburetor, which is similar to the carburetor shown in Fig. 4 as regards the fuel shut-off valve 100 and throttle valve 99, the action and control of same being identical to that described therein. In the conventional single passage carburetor, all of the atmosphere enters the induction system through a single passage 101 within the carburetor.

In this embodiment we have provided for silencing the engine pulsating sounds arising within and emitted from the induction system, while the engine is being used for braking purposes and for the conduction to the exterior of the vehicle, oil-scented air exhausted through the induction system, by means of a conventional silencer 102 communicating with the carburetor air passage 101 and a pipe 103 communicating with said silencer 102 and preferably the undermost exterior 104 of the vehicle, conventionally forming the bottom of the engine compartment. We have also provided for silencing of the exhaust sound, arising from allowing rapid escape of the atmosphere, at high pressure confined within the exhaust system, upon quick opening of valve 105, by means of conventional silencer 106, the final exit of atmosphere from the exhaust system being through a series of small holes 107 in the end of said conventional silencer.

Fig. 7 is a diagrammatic illustration of another embodiment of our invention, wherein provisions are made; for automatically supercharging the engine while braking and for quiet operation of the air control valve 108, which automatically allows ingress of atmosphere into the induction system as the engine requires it from same and automatically prevents egress of said atmosphere discharged from cylinders into said induction system, thus providing a temporary rise of pressure in said induction system to the end of assuring a full charge to enter one or more cylinders of a multi-cylinder engine which are undergoing an intake stroke at the time one or more cylinders are discharging into said induction system the residual atmosphere remaining in said cylinder at the time of inlet valve opening as described in the operating cycle for Figs. 1, 2, and 3; for simplifying the control and operating in timed relation all values from a central control unit which receives its motion from a single manual control pedal; for lessening the time required for raising to maximum, the pressure of the atmosphere confined within the exhaust system; to make use of the customary muffler 109 to silence the sound arising from allowing rapid escape of the atmosphere at high pressure confined within the exhaust system, by the valve 110, to be suddenly released, by placing the valve 110 in such relation within the exhaust system as diagrammatically illustrated in this figure and by so doing, the required reservoir of a volumetric capacity of approximately twelve times one cylinder of the engine, can readily be obtained in the exhaust system of conventional vehicles; for cooling the valve 110 in the exhaust when engine is driving the vehicle and for a substantially straight through or unrestricted flow of fluid through said valve when open.

Figs. 8, 9, 10 and 11 illustrate in detail the air control valve 108 diagrammatically shown in Fig. 7 and consist of: a mounting plate 111 for securing the entire valve onto the induction system 112 to the complete exclusion of atmosphere, when inoperative, by means of screws 113; a manually controlled upper cover 114 for sealing the valve against ingress of atmosphere when inoperative; an automatically controlled lower cover 115 to allow ingress and prevent egress of atmosphere from induction system while braking; a spring 116 to return upper cover 114 and lower cover 115 to their seats on mounting plate 111 and a clevis 117 for attaching a manual control to operate upper cover 114 as hereinafter described, said clevis 117 being adapted to receive a clevis pin in holes 118 at its upper end and electrically welded at other end 119 to upper cover 114, which at one end is curled to form a pivotal connection with mounting plate 111. Intermediate of the ends of said upper cover 114 is formed a circular protrusion 120 to serve as a guide for spring 116, said protrusion having a hole 121 at is center to clear pin 122 and at the other end said upper cover 114 is projected downward to seat upon mounting plate 111 to seal the opening 123 at this end and at the other end of said mounting plates integral extensions 124' and 124'' are formed upright, having holes to receive pivot pin 125 for upper cover 114.

The lower cover 115 at one end 126 has an upward projection nested within the mounting plate 111, to form a pivotal connection therewith when said lower cover is tilted by force of atmospheric pressure acting upon its opposite end, through holes 123 and 127 in mounting plate 111; the hole 123 being larger in area than hole 127 an unbalanced atmospheric force acts upon 127 said lower cover tending to produce undesired rotation of same, about pin 128, which rotation is opposed by the said upward projection 126 contacting with mounting plate 111, this said contact remaining until said lower cover 115 seats and seals the holes 123 and 127. Quiet operation of said lower cover is obtained by providing the relatively large seating area it has, thus obtaining a cushioning of the air expelled between it and said mounting plate 111 as they come together by action of spring 116 through means of two substantially L-shaped parts, electrically welded onto said lower cover 115 at 129' and 129'', being spaced apart at their upper ends to form a pivotal connection with one end 130 of split pin 131, the other end of which is extended through collar 132 and bent over as shown, to retain said collar and thus put spring 116 under tension for proper actuation of lower cover 115 and upper cover 114 upon which said spring 116 seats.

By action of the manual control diagrammatically shown in Fig. 7 the upper cover is rotated about pivot pin 125, uncovering the hole 123 in mounting plate 111 and allowing atmospheric pressure to act upon lower cover 115, moving it from its seat, admitting atmosphere into the induction system through holes 123 and 127, when pressure within said induction system is lower than that of atmosphere; but when pressure within the said induction system rises to near that of atmosphere, spring 116 returns lower cover 115 to its seat, preventing any egress of atmosphere from the induction system.

Figs. 12 and 13 show a modified form of valve, as described above, and illustrated in Figs. 8, 9, 10 and 11, which consists of: a mounting plate 133 for securing the entire valve onto the induction system 134 to the complete exclusion of atmosphere, when inoperative, by means of screws 135; a manually controlled upper cover 136 for sealing the valve against ingress of atmosphere when inoperative; an automatically controlled lower cover 137 to allow ingress and prevent egress of atmosphere from induction system; a spring 138 to return upper cover 136 and lower cover 137 to their seats on mounting plate 133; a guide shaft 139 for retaining upper cover 136 and lower cover 137 in correct positions both when active and inactive; and a bell-crank 130 for raising upper cover 136 by action from manual control, said bell-crank 140 being pivotally connected to a manual control at arm 141, as hereinafter described, the other arm 142 pivotally connected to a clevis 143, which is secured to upper cover 136. The bell-crank 140 is pivotally connected to links 144' and 144", which are pivotally connected to supports 145' and 145" of substantially L-shape, secured to mounting plate 133 by screws 135 and which also are used to secure said mounting plate to said induction system as before described. The clevis 143 and upper cover 136 are secured together by upsetting one end 146 of guide shaft 139, said upper cover having cemented or otherwise secured to it a gasket 147 of resilient or plastic material such as leather or lead, to aid in more readily obtaining and maintaining a tight seal of holes 148' and 148". Said guide shaft 139 has a bearing 149 in mounting plate 133, through which it can freely move. Freely movable upon said guide shaft is lower cover 137, upon which seats one end of spring 138, the other end being retained by collar 150, which puts said spring under tension for proper action of upper cover 136 and lower cover 137, said collar 150 being retained by slotted washer 151, shown in plan view in Fig. 14 and adapted to be received by the groove 152 in guide shaft 139 and retained in place by recess 153 in collar 150, said collar 150 being moved upward slightly to admit said washer 151 onto guide shaft 139.

When the bell-crank 140 is manually rotated in direction of arrow A, the upper cover 136 is raised from its seat on mounting plate 133, uncovering the holes 148' and 148" in mounting plate 133 and allowing atmospheric pressure to act upon lower valve 137, moving it from seat, admitting atmosphere into induction system, when pressure within said induction system is lower than that of atmosphere, but when pressure within induction system rises to near that of atmosphere, spring 138 returns lower cover 137 to its seat, preventing any egress of atmosphere from induction system. By having the seat diameter of lower cover 137 larger than the holes 148' and 148" in mounting plate 133 a cushioning effect is obtained to prevent noise of seating by forcing the air from between said lower cover and said mounting plate as they come together.

Figs. 17 and 18 illustrate in detail the central control unit, diagrammatically shown in Fig. 7, which consists of: a mounting plate 154, which may be secured to any suitable place about a vehicle, preferably the engine by means of the ears 155' and 155" and the holes 156' and 156" therein for mounting screw, etc.; cam 157 for operating the throttle valve in the induction system; cam 158 for operating the air control valve in the induction system; cam 159 for operating the valve in the exhaust system; bell-cranks 160, 161 and 162 for registering with cams 157, 158 and 159 respectively; and a spring for returning simultaneously all said cams to an inoperative position when manual control pedal is allowed to restore, said spring 163 being anchored at one end and a stud 164 riveted to the mounting plate and at the other end attached to an extension 165 integral with cam 158, which is adapted to receive a clevis pin through hole 166, said clevis pin passing also through similar holes in cams 157 and 159, providing for all three cams to move outward together by action of pedal 167, Fig. 7, and return together by action of spring 163 upon releasing said pedal 167; said cams slidingly fit in the slots formed in the integral upright ends 168' and 168" of mounting plate 154, which retains said cams in an upright position as shown, which are assembled into said mounting plates by entering their smaller end 169 through upright end 168', passing on to and through other upright end 168" except cam 158 which because of the extension 165 is entered first at its larger end 170 into upright end 168" of mounting plate 154 and allowed to drop into an open slot in end 168' of said mounting plate; said cam being retained from rising out of said slot by means of cams 157 and 159 by said clevis pin (not shown) when in place through holes 166 in their cams 157 and 159. Bell-cranks 160, 161 and 162 are rotatably mounted upon shaft 171 and held spaced in relation to their respective cams by collars 172', 172", 173' and 173", said shaft having a head at one end adapted to slidably enter a hole in the upper end of upright 175' formed integral with mounting plate 154 and through upright 175", also formed integral with mounting plate 154, said shaft being held in place by a split pin 176 passing through it, as shown.

Operation of this central control unit, as hereinafter described, moves cams 157, 158 and 159 simultaneously, as described above. The first part of this said movement instantly engages face 177 of cam 157 with lower arm 178 of bell-crank 160, producing angular movement of same as said cam 157 moves on until said lower arm 178 rests on top 179 of said cam 157, at which instant, face 180 of cam 158 has engaged lower arm 178 of bell-crank 161 and, as movement of said cams is continued, bell-cranks 161 and 162 are actuated in the same manner as described of bell-crank 160. Upon allowing pedal 167, Fig. 7, to restore, spring 163 restores cams 157, 158 and 159, the bell-cranks 160, 161 and 162 restoring as said cams recede by action of springs actuating the particular valves to which they are connected. Figs. 15 and 16 illustrate in detail the valve 110 diagrammatically shown in Fig. 7, and consist of: housing 181 providing passage for exhaust gas; a valve 182 for closing said passage; a cage 183 for containing said valve and mechanism also contained in said cage to operate said valve 182 by means of a bell-crank 184 pivotally connected in said cage 183 by pin 185. One arm 186 of said bell-crank 184 is provided with a hole 187 for connection of manual control means, as hereinafter described; the other arm 188 is pivotally connected to one end of links 189' and 189", the other ends pivotally connected to nut 190, which has a screw connection to valve stem 191 capable of being locked thereto by lock nut 192. Said valve stem 191 has a sliding bearing in said valve cage 183, which is mounted on said housing 181 and piloted therein concentric with seat 193 by means of cylindrical dowel 194 machined in said housing and faced off to form the flange 195, having imposed between it and said housing a gasket 196, all secured air tight together by four screws 197 equally spaced around said flange. Said cage 183 has a circular seat 198 protruding from its lower surface on which the valve head 182 seats when open, as shown, said seat provides cooling for said valve head and prevents leak past valve stem 191 at 199, said stem is integrally formed with valve head 182 and extending beyond same has another bearing 200 in housing 181, which at both extremities of passage 201 is adapted to snugly fit the pipes of the exhaust system extended in said housing (not shown) a short distance beyond slots 202' and 202", provided with lugs 203' and 203" on both sides thereof forming a clamp adapted to receive a bolt (not shown) through holes 204' and 204" for straightening said clamp and retaining said exhaust pipes.

The valve is manually controlled, as hereinafter described, by means of bell-crank 184, which rotates in the direction of arrow "A" (Fig. 7) to close valve by "straightening" the toggle joint formed by one arm 188 of bell-crank 184 and links 189' and 189", thus seating valve head 182 on seat 192 in housing. To provide seating of said valve head on seat 193 and enable said toggle to straighten in line with the valve stem 191, said stem is rotated in the nut 190 to accomplish this adjustment and locked in position by lock nut 192. By this mechanism, the force of the pressure within the exhaust system while braking, tending to raise the valve head 182 from its seat, is transmitted to the valve cage 183 and not to the control mechanisms.

The induction system, Fig. 7, comprises a conventional single passage or plain tube carburetor 205 having journaled within it a conventional throttle valve 206 for controlling the fuel supply to engine and in communication with said carburetor and engine is a pipe 207 having secured to it the valve 108.

The exhaust system consists of a pipe 208 communicating the engine with the exhaust silencer 109 and secured to said pipe is the valve 110.

In this figure the braking mechanism is shown as being fully restored or inactive and in this state the engine can be operated as a power and controlled as such by means of the conventional throttle valve 206 which is operated in a conventional manner by conventional means (shown in part and designated as 209) and similar to those herein described in preceding figures.

For manually controlling the engine as a brake, suitable mechanical control means are provided and, as diagrammatically illustrated, consist of a crank arm 210, one end of which is rotatably secured to throttle valve 206, the other end pivotally connected to one end of rod 211, the other end pivotally connected to one arm 212 of bell-crank 213, the arm 214 pivotally connected to one end of rod 215, the other end pivotally connected to one arm of bell-crank 160, the other arm disposed to slidably engage with cam 157.

The valve 108 in the induction system is controlled by means of the crank arm 117, one end of which is rotatably secured to valve 108, the other end pivotally connected to one end of rod 216, the other end pivotally connected to one arm of bell-crank 161, the other arm disposed to slidably engage with cam 158.

The valve 110 in the exhaust system is controlled by means of bell-crank 184, arm 186 of which is pivotally connected to one end of rod 217, the other end pivotally connected to one arm 218 of bell-crank 219, also secured at this place is one end of spring 220, the other end suitably anchored; the other arm 221 of said bell-crank is pivotally connected to one end of rod 222, the other end pivotally connected to one arm of bell-crank 162, the other arm disposed to slidably engage with cam 159.

The three cams 157, 158 and 159, shown in detail in Figs. 17 and 18 and identified by the same numbers as in Fig. 7, are joined and move simultaneously by means of pin 223, Fig. 7, which also connects to said cams, one end of rod 224, the other end being pivotally connected to one end of lever 225, the other end pivotally connected to one end of pedal 167.

To operate the engine as a brake, effort is applied to pedal 167, the first part of the total movement of which moves the throttle valve 206 from any driving position it may be set, to fully closed of passage 227, by means of pedal 167 moving in direction of arrow A, transmitting movement to rod 226, to lever 225, rotating it in the direction of arrows $A_1$ and $A_2$, to rod 224, to cams 157, 158 and 159, moving the face 177 of cam 157 completely under the end of arm 178 of bell-crank 160, rotating same in direction of arrow $A_3$ until it reaches top 179 of cam 157, transmitting this motion to rod 215, to bell-crank 213, to rod 211 and throttle 206.

At this setting of the brake mechanism, the fuel supply from carburetor 205 is fully shut off from the engine and the induction system closed, causing the engine to cease producing driving power.

By further application of effort upon pedal 167 or the second part of total movement of same, the valve 108 in induction system is opened fully (the throttle valve 206 remaining in position as previously described) by means of cam 158 acting in a manner the same as previously described of cam 157, transmitting motion to rod 216 and to valve 108.

At this setting of the brake mechanism, atmosphere is automatically allowed to enter the induction system, through valve 108, as previously described, and pass into the engine wherefrom it is discharged through the exhaust system. The engine at this setting, upon being driven by vehicle offers no more braking power than occurs from shutting off the ignition without the use of this brake mechanism.

By further application of effort upon pedal 167 to complete its total movement, the valve 110 in the exhaust system is closed (the throttle 206 and air control valve 108 remaining in the same position as previously described) by means of cam 159 acting in a manner the same as previously described of cams 157 and 158, transmitting motion to rod 222, to bell-crank 219, rotating it in the direction of arrow $A_4$ to increase the tension on spring 220 and move rod 217 to close valve 110, thus completing the operations of converting the engine for braking power; the operation of the engine and cycles thereof are the same as described for the operation of the engine in Figs. 1, 2 and 3, except as regards the functioning thereof with the air control valve 108 which is accomplished by closing the induction system to the exit of atmosphere from the engine by closing the throttle valve 206, raising the upper cover of the air control valve 108, the lower cover being automatically held closed and thereby, instead of allowing to escape from the induction system the residual atmosphere discharged by the cylinder of a single cylinder or cylinders of a multi-cylinder engine, into said induction system and be dissipated as described in Figs. 1, 2 and 3, said atmosphere discharged is confined thereto, raising the pressure of the atmosphere present therein, by reason of producing a temporarily excessive amount thereof and in the case of a single cylinder engine, this atmospheric pressure rise providing a force to decelerate the velocity of atmosphere flowing out of said cylinder and immediately return said atmosphere into said cylinder as it continues through the induction stroke which started at the time the inlet valve 228 opened to release said residual atmosphere, thus the volumetric efficiency of the engine is maintained as high as during driving or producing power. In the case of a multi-cylinder engine, the above supercharging action, instead of affecting the cylinders it was discharged from, as above described, forces atmosphere into other cylinders, further along in their induction stroke and these cylinders in turn supercharging others as the braking cycle continues. It is evident that, because of atmosphere leaking out of the entire system, past pistons, valves and joint, from time to time additional atmosphere must enter the induction system and is supplied by automatic action of the lower cover of the supercharging valve when the pressure within the induction system, because of said leaks, falls below that of external atmosphere, in a manner as described in Figs. 8 and 12.

Fig. 19 diagrammatically illustrates the position of pedal 167, Fig. 7, within a vehicle, wherein said pedal 167 is pivotally mounted upon the conventional shaft 229 provided for pivotal mounting of the conventional clutch pedal 230 and brake pedal (not shown) and so constructed and arranged that the operator's foot (usually the left one), used to actuate the said conventional clutch pedal 230, can conveniently be moved from the said clutch pedal 230 out to the pedal 167 for operating the engine brake mechanism.

Fig. 20 diagrammatically illustrates in part the exhaust system of Fig. 7, having located at the extremity thereof a modified form of valve 231 for closing the exhaust system while braking, wherein means are provided for "self holding" said valve in a closed position as shown and adapted to be operated the same as valve 110, Fig. 7. Said valve 231 is shown in open position and in detail construction in Figs. 21 and 22, and consists of a body 239 adapted to be pressed onto the exhaust system pipe 208 and retained by screw 232 threaded in said body and extending into said pipe 208, so constructed and arranged that said pipe 208 extends beyond said body forming a seat 233 for the cover 234, which is faced with a gasket 235 of suitable material, such as lead, and retained thereto by screw 236 and nut 237, said cover is pivotally connected to an extension 238 of body 239, which fits into a slot 240 separating said cover at this end into two arms 241' and 241" through which is entered pivot pin 242, which is held in place by a tight fit in extension 238 of body 239, while a loose fit is allowed in arms 241' and 241" for free rotation of cover 234, said arms 241' and 241" are pivotally connected to one end of links 243' and 243", the other end pivotally connected to one arm of bell-crank 244, the other arm having a hole 245 at its outer end is adapted to be connected to rod 217, Figs. 7 and 20. Said bell-crank is pivotally connected by pivot pin 246 to extension 247 of body 239 which retains said bell-crank between its two sides 248' and 248", and disposed between said sides is a central projection 249 forming a stop for bell-crank 244 when cover is seated upon seat 233, as shown in Fig. 20.

Fig. 23 illustrates a conventional form of cylinder intake and exhaust valves wherein provisions are made to eliminate power loss by atmosphere leaking out past the valve stem 250, while engine is braking by means of a suitable packing material 251, such as asbestos, etc., which is held compressed around the valve stem 250 at the lower end of its bearing formed by the boss 252 by action of the conventional valve spring 253 for returning the valve to its seat after lifted by engine operation, which seats at one end upon the retaining cup 254, and retained at its opposite end by collar 235 held in place by pin 256 passing through the valve stem 250. As the packing 251 wears by normal operation of said valve the spring 253 moves the cup 254 upward, thus keeping the packing constantly in contact with the stem 250.

Fig. 24 illustrates a modified form of packing arrangement, as shown in Fig. 23, in that the packing 251 is contained at the upper end of the valve stem bearing 257 instead of the lower end, thus enabling lubrication of said bearing 257, which is exposed to oil in crankcase and still preventing leak past said stem 250 by action of spring 253, which at one end is secured to the valve stem as described in Fig. 23, and at the other end seating upon a collar 258 integral with the valve stem bearing 257, which is free to move in the valve boss 252, thus keeping the packing 251 tightly compressed around the valve stem 250.

Figs. 25, 26, 27, 28, 29 and 30 diagrammatically illustrate a means of obtaining two-stroke cycle operation while braking with a conventional engine, which when driving or producing power operates on a conventional four-stroke cycle, but while braking operates selectively at will of driver on either a four or two-stroke cycle, the latter cycle substantially doubling the braking power obtained as described in preceding figures by using the same braking mechanism as described therein, which means that each movement of the piston outward of the cylinder is an induction stroke and each following inward movement is a power stroke, the atmosphere being taken into the engine, stored in the exhaust system and used from the same to impose a load on the piston, as described in the preceding figures.

In Fig. 26 the cylinder is designated by the dotted circle 259, the cylinder intake valve by the dotted circle 260, and the cylinder exhaust valve by the dotted circle 261; contacting under the exhaust valve are the levers 262' and 263' for operating same, said levers also contacting with cams 264' and 265' respectively, Figs. 27 and 29, shown spaced in angular relation and in linear relation also in Fig. 26 (set apart from Fig. 26 for clearness of illustration) and contacting under the intake valve are levers 262" and 263" for operating same, said levers also contacting with cams 264" and 265", Figs. 27 and 29, shown also in Fig. 26. The said levers 262', 262", 263' and 263" are rotatably mounted onto crankshaft 266, journaled at 267' and 267" in walls of crank case and adapted to be rotated by lever 268 and connecting rod 269 to bring said levers 262' and 263' into engagement with valves 261 and 260 respectively, simultaneously taking levers 262" and 263" out of engagement with said valves and vice versa. Springs 270, Fig. 25 (not shown in Fig. 26 for reasons of clearness of illustration) are attached to levers 262', 262", 263' and 263" for maintaining said levers in contact with their respective cams when and where not actuating the valves 260 and 261 to prevent said levers from rattling or causing noise.

Conventional engines operating on a four-stroke cycle have cam-shaft 271 for operating the cylinder valves which are driven one revolution in each two revolutions of the crankshaft 272 for actuating the cylinder piston 273, said camshaft 271 having conventionally mounted upon it, one cam for each cylinder valve and diagrammatically shown in angular relation to each other in Fig. 27, these cams being known as "single lobe cams" open and close their respective valves once in every revolution of same, making one complete revolution for each two of the crankshaft 272, actuating the cylinder pistons 273 and the angular timing relation of crank-shaft 272 to cylinder valves opening and closing as shown in Fig. 38, wherein the crank-shaft is considered as rotating in the direction of arrow A, the position 274 of the crank-shaft corresponding to the cylinder piston 273 starting the induction stroke, the single lobe of the inlet cam 265", Fig. 27, engages lever 263", Fig. 26, in contact with intake valve 260 to open it and close it at position 175, Fig. 28, where the piston completes the induction stroke; the crank-shaft 272 rotating onward, driving the cam-shaft around and as the piston in completing the compression and power stroke at position 276, Fig. 28, where the exhaust stroke starts and the single lobe of the exhaust cam 265', Fig. 27, engages the lever 263', Fig. 26, in contact with the exhaust valve 261 to open it and close it at the position 274, Fig. 28, immediately thereupon starting another cycle, consisting of four strokes and two revolutions of said crank-shaft 272, Fig. 25. It now follows that to obtain two-stroke cycle operation of the engine another set of cams having "two lobes", as shown in angular relation in Fig. 29, and another set of levers in contact with the cylinder valves 260 and 261, a timing relation of valves to piston 273 would be, as shown in Fig. 30, wherein at position 277 the piston starts the induction stroke and the lobe 278' and cam 264", Fig. 29, engages lever 262" in contact with intake valve 260 (levers 263' and 263" being out of contact with cylinder valves as before described) to open and close said valve at position 279, Fig. 30, where the piston completes the induction stroke, immediately thereupon starting the exhaust and power stroke of braking and lobe 280' of cam 264', Fig. 29, engages the lever 262', Fig. 26, in contact with the exhaust valve 261 to open it and close it at the position 277, Fig. 30, immediately thereupon starting another cycle wherein the lobes 278" and 280" of said cams 264' and 264" function the same as described above for lobes 278' and 280', i. e., one set of lobes operating the valve for one cycle and the second set for the following and so on alternately, the cycle consisting of only two strokes of the piston and one revolution of said crank-shaft 272, thereby effecting substantially double braking power from an engine so constructed and arranged.

Figs. 31 and 32 illustrate a part of the induction system known as a "dual manifold" for multi-cylinder engines and conventionally used on eight-cylinder in-line engines, adapted to connect by conventional means with said cylinders at the flanges 281 and 282, Fig. 31 (which is a sectional view of one half of said manifold, the other half being identical) and with a conventional dual carburetor at flange 283, also by conventional means, said manifold having separate passages 284 and 285 leading to separate groups of cylinders and because of these separate passages, all cylinders are not in communication with each other, which is an objectionable condition for supercharging while braking and is overcome by means of a communicating passage 286, wherein is provided a valve 287 which is normally maintained closed as shown, connected to and opened by the supercharging valve of the type shown in Fig. 12, adapted to be mounted upon said communicating passage at 287.

Supercharging must always be thought of as a relative term, meaning a larger charge than is normally possible under a given operating condition of anything requiring charging of substance it is charged with, and in this case the substance is air. Rapid expelling of air from the cylinder when the inlet valve opens, causes air in the manifold to keep on moving to an extent that a partial vacuum results in the cylinder and manifold before a reversal of air takes place to refill the cylinder as the piston moves downwardly through its recharging motion, or inlet stroke, therefore at high engine speed an undercharge results in the cylinder at the time the inlet stroke is completed and the inlet valve is again closed, thus the engine power of braking is reduced under that which is possible to obtain with a full charge—and such is the normal charging condition—now to provide a means to assure a full charge in the cylinder is relatively speaking, providing supercharging means, the like of such means are illustrated and when applied to a single cylinder engine the action is to build a pressure in the induction system which actually rises momentarily to above that of atmospheric pressure, however, the charge in the cylinder and manifold falls off to substantially atmospheric pressure when recharging is completed. In the case of multi-cylinder engines, one cylinder of a series connected to a manifolded induction system will be expelling air while one or more are recharging with the result of the one cylinder supercharging the others to the extent as above explained.

We claim:

1. In combination with an induction system of an internal combustion engine adapted to be converted into a fluid compression brake, said induction system having a fuel port, an air port, of two-way valve means for establishing communication of said air port and fuel port, means for actuating said valve to regulate the fuel supply to said induction system through said fuel port, and means cooperating with said valve regulating means whereby said valve means may be actuated from any degree of open position thereof for admission of fuel to said induction system, to fully closed position thereof and fully open position for the admission of atmosphere and whereby when said manually operated means is actuated, actuation of said valve regulating means is restricted.

2. In an internal combustion engine having an induction system and an exhaust system, said induction system provided with fuel regulating means, means for converting said engine into a fluid compression brake, comprising means separate from said fuel regulating means for shutting off the fuel supply, means for admitting atmosphere only to said induction system, means for shutting off the exhaust system and a unitary means operatively connected to each of the last three mentioned means for respectively actuating the same successively.

3. The combination with an induction system of an internal combustion engine adapted to be converted into a fluid compression brake, said system comprising an intake manifold, fuel supply means, and manual means for regulating said fuel supply, of means operable independent of said manual means for completely shutting off said fuel supply, means operable for opening said induction system to atmosphere when said fuel supply is shut off, said last-mentioned means comprising an opening in said induction system and a one-way valve operable by depression in said system to permit air to enter into said system and to prevent exit therefrom.

4. The combination with a four-stroke cycle internal combustion engine having a cylinder provided with inlet and outlet ports, a piston reciprocating therein, an induction system in communication with said cylinder, said induction system being provided with means for regulating fuel supply to the engine and an exhaust system, of means for shutting off said fuel supply, valve means operable by the suction stroke of said piston for opening said induction system to atmosphere when said fuel supply is shut off, and means for shutting off the exhaust system, said piston operated valve means cooperating with said piston to provide a charge of atmosphere above atmospheric pressure in said induction system when said systems are shut off substantially as described.

5. In an internal combustion engine, an induction system, an exhaust system, means communicating with said induction system for supplying fuel to said engine, manual means for regulating the fuel supply to said engine, means for shutting off the exhaust system and means associated with said last-mentioned means and cooperating with but operable independent of said regulating means to prevent entering of fuel into said induction system and to admit atmosphere to said induction system, said fuel supply means being shut off prior to the opening of said induction system to atmosphere.

6. In an internal combustion engine having an induction system and an exhaust system, means for regulating the fuel supply to said induction system, and means for converting said engine into a fluid compression brake, said converting means comprising valve means, independent of said fuel regulating means, for shutting off the fuel supply to said induction system and for admitting atmosphere to said induction system, valve means for shutting off the exhaust system, and a single manually operative control member for operating both of said valve means.

7. In combination with an internal combustion engine having an induction system and an exhaust system, with means for regulating the fuel supply to said induction system, and manual means for operating said fuel regulating means, mechanism for converting said engine into a fluid compression brake and including means for shutting off said exhaust system, means in addition to and operable independently of said manual operating means for said fuel regulating means for operating said fuel regulating means to prevent entry of fuel into said induction system and to admit atmosphere to said induction system, and means associated with said fuel regulating means for maintaining the same at engine idling position after said additional means are inoperative.

8. In an internal combustion engine having an induction system, said induction system comprising a manifold, a carburetor communicating therewith, valve means for normally regulating the fuel supply from said carburetor, means cooperating with said regulating means for shutting off the fuel supply to said induction system, and further valve means operable by a depression in the induction system for establishing communication of said system with the atmosphere.

9. In an internal combustion engine having an induction system, said induction system comprising a manifold, a carburetor comunicating therewith, valve means for normally regulating the fuel supply from said carburetor, means for shutting off the fuel supply of said induction system, and further valve means responsive to a depression in said induction system for establishing communication of said induction system with the atmosphere.

10. In combination with an internal combustion engine having an induction system including a manifold and fuel supply means in communication with said manifold, means for converting said engine into a fluid compression brake comprising means for shutting off the exhaust of said engine, manually controlled means including a valve to normally regulate the fuel supply to said engine, means operable independently of said manual means and cooperating with said valve for shutting off the fuel supply, and means establishing communication of said induction system with the atmosphere.

11. The combination with an induction system of an internal combustion engine adapted to be converted into a fluid compression brake, said system including a manifold, a carburetor communicating with said manifold, and manually controlled valve means to regulate the fuel supply to said manifold, of means associated with said manual means but operable independently thereof for shutting off the fuel supply so that said induction system is open to atmosphere only, and further valve means in said induction system controlled by said independent fuel control means and operable simultaneously with the shutting off of the fuel supply for the admission of further atmosphere only.

12. The combination with an induction system of an internal combustion engine adapted to be converted into a fluid compression brake, said system including a manifold, a carburetor communicating with said manifold and manually controlled valve means to regulate the fuel supply to said manifold, of means associated with said manual means but operable independently thereof for shutting off the liquid fuel supply to the induction system, and further valve means in said induction system, controlled by said independent fuel control means, and operable for admitting atmosphere only to said induction system.

13. The combination with an induction system of an internal combustion engine adapted to be converted into a fluid compression brake, said system including a manifold, a carburetor communicating with said manifold and manually controlled valve means to regulate the fuel supply to said manifold, of means associated with said manual means but operable independently thereof for shutting off the liquid fuel supply to the induction system, and further valve means in said induction system, controlled by said independent fuel control means, and operable for admitting atmosphere only to said induction system, said engine being provided with an exhaust system, and valve means for shutting off the exhaust system controlled by said independent fuel control means.

14. In an internal combustion engine having an induction system and an exhaust system, said induction system being provided with fuel regulating means, means for converting said engine into a fluid compression brake, said converting means comprising means for shutting off the fuel supply, means independent of the exhaust system for admitting atmosphere only to said induction system, means for shutting off the exhaust system, and unitary means positively connected to each of said last three mentioned means for actuating the same.

15. In an internal combustion engine having an induction system and an exhaust system, said induction system being provided with fuel regulating means, means for converting said engine into a fluid compression brake, said converting means comprising means for shutting off the fuel supply, means for admitting atmosphere only to said induction system, means for shutting off the exhaust system, and unitary means operatively connected to each of said last three mentioned means for actuating the same and operable for shutting off the fuel supply without shutting off the exhaust system.

16. In an internal combustion engine having an induction system and a valve for regulating the supply of fuel thereto, means for converting said engine into a fluid compression brake, comprising means for actuating said valve for shutting off the fuel supply to the induction system, and a one-way inwardly opening valve adapted to admit air to said induction system.

17. In an internal combustion engine having an induction system and an exhaust system, a valve for regulating the supply of fuel to the induction system, and means for converting said engine into a fluid compression brake comprising means for shutting off the exhaust system, means for actuating said valve to shut off the fuel supply to said induction system, a one-way inwardly opening valve for admitting atmosphere to said induction system, and a unitary means for controlling said last three mentioned means.

18. In an internal combustion engine having an induction system and an exhaust system and including a combustion chamber having inlet and exhaust valves associated therewith, means for converting said engine into a fluid compression brake comprising means for shutting off the exhaust system, means for sealing said inlet and exhaust valve stems against loss of fluid under pressure, and means for shutting off the entry of fuel to said induction system.

19. In an internal combustion engine having an induction system and an exhaust system, means for converting said engine into a fluid compression brake comprising means for shutting off the exhaust system, a fuel regulating valve associated with said induction system, means for sealing said induction system against escape of fluid under pressure therefrom and including means for shutting off said regulating valve, and a one-way inwardly opening valve associated with said induction system.

20. In an internal combustion engine having an induction system, an exhaust system and means for supplying fuel to said induction system, means for converting said engine into a fluid compression brake comprising means for shutting off the fuel supply to the induction system, means for shutting off the exhaust system, and means for raising the pressure in the induction system above atmospheric pressure when braking.

21. In an internal combustion engine having an induction system, an exhaust system and means for supplying fuel to said induction system, means for converting said engine into a fluid compression brake comprising means for shutting off the fuel supply to the induction system, means for shutting off the exhaust system, and means including a one-way inwardly opening valve adapted to admit air to said induction system for raising the pressure therein above atmospheric pressure when braking.

22. In an internal combustion engine having an induction system and an exhaust system, means for regulating the fuel supply to said induction system, means for converting said engine into a fluid compression brake, said converting means comprising means independent of said fuel regulating means for shutting off the fuel supply to said induction system and for admitting atmosphere to said induction system, means for shutting off the exhaust system and a single manually operative control member operatively connected with said last mentioned means in such manner that the exhaust system is closed after said induction system has been opened to atmosphere.

23. In an internal combustion engine having an induction system and an exhaust system, means for converting said engine into a fluid compression brake, means for shutting off said exhaust system, comprising, a regulating valve means for actuating said valve to regulate the fuel supply to said induction system, a means operable independent of said regulating means for actuating said valve in such manner that fuel to said induction system is completely shut off and atmosphere only is permitted to enter therein.

24. In an internal combustion engine having an induction system, said induction system comprising a manifold, a carburetor communicating therewith, valve means for normally regulating the fuel supply from said carburetor to said engine, means cooperating with said valve means for shutting off the fuel supply to said induction system, and further valve means controlled by said fuel shut-off means for establishing communication of said induction system with the atmosphere.

25. In an internal combustion engine having an induction system, said induction system comprising a manifold, a carburetor communicating therewith, valve means for normally regulating the fuel supply from said carburetor, means cooperating with said regulating means for shutting off the fuel supply to said induction system, and further valve means controlled by said shut-off means and responsive to a depression in said induction system for establishing communication of said system with the atmosphere.

26. The combination with an induction system of an internal combustion engine adapted to be converted into a fluid compression brake, said system including means for shutting off the exhaust of said engine, a manifold, a fuel supply means communicating with said manifold, and manually controlled means including a valve to normally regulate the fuel supply to said engine, of means operable independent of said manual means and cooperating with said valve for shutting off the fuel supply and for establishing communication of said induction system with the atmosphere after said fuel supply is shut off.

27. The combination with an induction system of an internal combustion engine adapted to be converted into a fluid compression brake, said system including a manifold, a carburetor having a valve for establishing communication with said manifold, and manually controlled valve means independent of said carburetor valve to regulate the fuel supply to said manifold, of means cooperating with said carburetor valve and said valve regulating means for shutting off the supply of fuel and for opening said induction system to atmosphere.

28. In an internal combustion engine having an induction system, an exhaust system, fuel supply means and means combined with the induction system for normally regulating the fuel supply to said engine, and manually operated means for shutting off the exhaust system and cooperating with said fuel regulating means to control the same from any degree of open position thereof for admission of fuel to said induction system to a fully closed position thereof, and in such manner that when said manually operated means is in inoperative position, said fuel regulating means is capable of operation independent of said manually operated means.

29. In an internal combustion engine having an induction system and an exhaust system, said induction system being provided with fuel regulating means, means for converting said engine into a fluid compression brake, said converting means comprising means for closing the fuel regulating means, means for admitting atmosphere only to said induction system, means for shutting off the exhaust system, and unitary means operatively connected to each of said last three mentioned means for actuating the same.

30. In an internal combustion engine having an induction system and an exhaust system, said induction system including a carburetor and being provided with fuel regulating means, means for converting said engine into a fluid compression brake, said converting means comprising means for shutting off the fuel supply, means independent of the carburetor and exhaust system for admitting atmosphere only to said induction system, means for shutting off the exhaust system, and unitary means operatively connected to each of said last three mentioned means for actuating the same.

31. In an internal combustion engine having an induction system and an exhaust system, said induction system including a carburetor and being provided with fuel regulating means, means for converting said engine into a fluid compression brake, said converting means comprising means for shutting off the fuel supply, means independent of the exhaust system and located between the carburetor and the engine for admitting atmosphere only to said induction system, means for shutting off the exhaust system, and unitary means operatively connected to each of said last three mentioned means for actuating the same.

32. In an internal combustion engine having an induction system and an exhaust system, said induction system being provided with means for regulating the flow of combustible mixture within said induction system, means for converting said engine into a fluid compression brake, said converting means comprising means for operating said regulating means to prevent the flow of said combustible mixture to said engine, means for admitting atmosphere only to said induction system, means for shutting off the exhaust system, and unitary means operatively connected to each of said last three mentioned means for actuating the same.

33. In an internal combustion engine having an induction system, an exhaust system and means for supplying fuel to said induction system, means for converting said engine into a fluid compression brake comprising means for shutting off the fuel supply to the induction system, means for shutting off the exhaust system, and means for raising the pressure in the induction system above atmospheric pressure when braking, said means including valve means opening said induction system to atmosphere independent of said exhaust system.

34. In an internal combustion engine having an induction system, an exhaust system and valve means for regulating fuel to said induction system, means for converting said engine into a fluid compression brake comprising unitary means for closing said regulating valve means to the induction system, for shutting off the exhaust system, and for raising the pressure in the induction system above atmospheric pressure when braking.

35. In an internal combustion engine having an induction system, an exhaust system and means for supplying fuel to said induction system, means for converting said engine into a fluid compression brake comprising means for shutting off the fuel supply to the induction system, means for shutting off the exhaust system, and means including a one-way inwardly opening valve mechanism opening direct to atmosphere independent of the exhaust system and adapted to admit air to said induction system for raising the pressure therein above atmospheric pressure when braking.

36. In an internal combustion engine having an induction system and an exhaust system, said induction system being provided with means for regulating the fuel supply to said engine, means for converting said engine into a fluid compression brake, said converting means comprising means for immediately closing said fuel regulating means to prevent the flow of fuel to said engine, means independent of the exhaust system for admitting atmosphere only to said induction system, means for shutting off the exhaust system, and unitary means mechanically connected to each of said last three mentioned means for actuating the same.

37. In an internal combustion engine having an exhaust system, an induction system and a valve for regulating the supply of fuel thereto, means for converting said engine into a fluid compression brake, comprising means for actuating said valve for shutting off the fuel supply to the induction system, and a one-way inwardly opening valve adapted to admit air to said induction system independent of said exhaust system.

JOHN T. RAUEN.
CARL F. RAUEN.